US012032199B2

(12) United States Patent
Panas et al.

(10) Patent No.: US 12,032,199 B2
(45) Date of Patent: Jul. 9, 2024

(54) SYSTEMS AND METHODS FOR OPTICAL SENSOR PROTECTION (71) Applicants: Lawrence Livermore National Security, LLC, Livermore, CA (US); Bright Silicon Technologies, Inc., San Francisco, CA (US); Raytheon Company, Waltham, MA (US)

(72) Inventors: Robert Matthew Panas, Dublin, CA (US); Robert S. Mchenry, San Francisco, CA (US); Gerald P. Uyeno, Tucson, AZ (US)

(73) Assignees: Lawrence Livermore National Security, LLC, Livermore, CA (US); Bright Silicon Technologies, Inc., San Francisco, CA (US); Raytheon Company, Waltham, MA (US)

( * ) Notice: Subject to any disclaimer, the term of this patent is extended or adjusted under 35 U.S.C. 154(b) by 128 days.

(21) Appl. No.: 17/725,030

(22) Filed: Apr. 20, 2022

(65) Prior Publication Data
US 2023/0341617 A1 Oct. 26, 2023

(51) Int. Cl.
*F21V 8/00* (2006.01)
*G02B 6/32* (2006.01)

(52) U.S. Cl.
CPC ......... *G02B 6/0093* (2013.01); *G02B 6/0031* (2013.01); *G02B 6/325* (2013.01)

(58) Field of Classification Search
CPC .... G02B 6/0093; G02B 6/0031; G02B 6/325; H04N 23/52; H04N 23/55; H04N 23/75; H04N 17/002
See application file for complete search history.

(56) References Cited

U.S. PATENT DOCUMENTS

| | | | | |
|---|---|---|---|---|
| 5,255,117 A | * | 10/1993 | Cushman | G02B 5/005 250/233 |
| 6,548,807 B2 | * | 4/2003 | Becht | G01J 1/26 250/559.38 |
| 10,444,492 B2 | | 10/2019 | Hopkins et al. | |

* cited by examiner

Primary Examiner — Seung C Sohn
(74) Attorney, Agent, or Firm — HARNESS, DICKEY & PIERCE, P.L.C.

(57) ABSTRACT

The present disclosure relates to an optical sensor protection system. The system may have a sensor for receiving an incoming optical signal, a passive sensing and modulation component, and an active sensing and modulation subsystem. The passive sensing and modulation component is configured to sense when a first characteristic is associated with the incoming optical signal is present that adversely affects operation of the sensor, and redirects at least a portion of the incoming optical signal thereof away from the sensor to thus reduce an intensity of the incoming optical signal reaching the sensor. The sensor is located on an image plane downstream of the ISM subsystem, relative to a path of travel of the incoming optical signal. The active sensing and modulation subsystem has an active modulation component and is located upstream of the passive sensing and modulation component, relative to the path of travel of the incoming optical signal, and is also located on a conjugate image plane, and is configured to use the redirected portion of the incoming optical signal as feedback in controlling a modification of the incoming optical signal to reduce a risk of damage to the passive sensing and modulation component.

20 Claims, 5 Drawing Sheets

SYSTEMS AND METHODS FOR OPTICAL SENSOR PROTECTION

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for protecting optical sensors and optical devices from excessive duration or excessive intensity optical radiation which can damage the optical sensor or device, and more particularly to systems and methods for protecting optical sensors and devices which incorporate features from both Integrated Sensing and Modulation (ISM) and Decoupled Sensing and Modulation (DSM) type systems into an integrated detection and damage suppression system, without the limitations of traditional ISM and DSM based systems.

BACKGROUND

The statements in this section merely provide background information related to the present disclosure and may not constitute prior art.

Several approaches presently exist to protect valuable optical sensors. The more common approaches can broadly be separated into two general categories based on response physics, passive and active. The first is Integrated Sensing and Modulation (ISM) approaches. ISM approaches often rely on non-linear material property sensitivity to optical intensity. These approaches will often be referred to as 'passive', given the common approach of using intrinsic material behavior for integrated sensing/actuation, however there may be cases where the ISM system requires some level of active interaction, such as an applied voltage or temperature. Material-property-based ISMs might change phase to alter their reflectivity or transmissivity when exposed to high intensity signals. This nonlinear response can be exploited to create intensity filters which rely on the non-linear phase change behavior. ISM approaches are typically able to respond quickly owing to the reliance on material properties, but the response often degrades under extended exposure to a high intensity signal. The ISM approach thus involves a system which essentially incorporates both the sensor and actuator functions, which makes the ISM approach particularly desirable for compact systems, but may leave the system vulnerable to extremes in light intensity or duration. In either extreme, a system incorporating the ISM approach can break down, leading the system to cease operation as a filter.

The second approach to protect valuable sensors is known as the "Decoupled Sensing and Modulation" (DSM) approach. The DSM approach provides greater design freedom in building a system to withstand extremes in light intensity or duration. The DSM approach uses separate components for sensing and modulation of the light. A DSM system may rely either on the main sensor or on a separate intensity sensing element to determine when the damage threshold is reached. Thus, the DSM approach will often be referred to as an 'active' approach, given the common need for sending power signals to, or between, the separate sensing and actuation components of the system. Generally, DSM systems require commands to be transmitted to a modulating component to redirect the incoming light when the damage threshold is reached. This redirection may be done in many ways including mechanically, via shutters or micro-opto-electro-mechanical systems (MOEMS), or via electronic modulators like acousto-optic modulators or LCDs. The active modulation element can be optimized in design to be resistant to both extremes of light intensity and duration. The sense component in the DSM is often then shielded by the modulation component from extremes in intensity or duration of exposure. This differs from the ISM approach where the sense element is unavoidably directly exposed to the incoming light and is integrated with the modulating component, thus making the design of the sensing and modulating functions coupled.

DSM approaches are typically thus able to withstand greater scales of light intensity and duration. The tradeoff is that the typical, hardened DSM modulating element response time is much slower than the typical ISM modulating material property response. As a result, while ISM provides protection against short duration signals, the DSM provides protection against high amplitudes and long duration signals.

Emerging optical sources are presenting ever-increasing challenges for high performance optical sensors as technology continues to push the envelope of incident light temporal scale (i.e., shorter optical pulses but longer duration of exposure) as well as intensity scale. These challenges require performance beyond the capabilities of either of the traditional ISM and DSM approaches. Next generation sensor protection must have the ability to respond to ultra-short duration pulses while sustaining protection over long durations and at extremely high intensities. Such protection is required for safety critical imaging systems which must operate without interruption despite potential blinding events. One emerging example of this is found in autonomous vehicles where safety critical imaging systems can be blinded or damaged by intense light sources or lasers, whether accidental or deliberate.

SUMMARY

This section provides a general summary of the disclosure, and is not a comprehensive disclosure of its full scope or all of its features.

In one aspect the present disclosure relates to an optical sensor protection system. The system may comprise a sensor for receiving an incoming optical signal, a passive sensing and modulation component, and an active sensing and modulation subsystem. The passive sensing and modulation component is configured to sense when a first characteristic associated with the incoming optical signal is present that adversely affects operation of the sensor, and redirects at least a portion of the incoming optical signal thereof away from the sensor to thus reduce an intensity of the incoming optical signal reaching the sensor. The sensor is located on an image plane downstream of the passive sensing and modulation component, relative to a path of travel of the incoming optical signal. The active sensing and modulation subsystem is located upstream of the passive sensing and modulation component relative to the path of travel of the incoming optical signal, and further is located on a conjugate image plane with the sensor. The active sensing and modulation subsystem has an active modulation component and is configured to use the redirected portion of the incoming optical signal as feedback in controlling modulation of the incoming optical signal. This reduces a risk of damage to the passive sensing and modulation component In another aspect the present disclosure relates to an optical sensor protection system. The system may comprise a sensor for receiving an incoming optical signal, a passive sensing and modulation component, and an active sensing and modulation component. The passive sensing and modulation component forms an integrated sensing and modulation (ISM) component configured to sense when a first characteristic associated with the incoming optical signal is present that adversely affects operation of the sensor, and redirects at least a portion of the incoming optical signal thereof away from the sensor to thus reduce an intensity of the incoming optical signal reaching the sensor. The sensor is located on an image plane downstream of the ISM component, relative to a path of travel of the incoming optical signal. The active sensing and modulation subsystem forms a decoupled spatial modulator (DSM) subsystem located upstream of the ISM component relative to the path of travel of the incoming optical signal and upstream of the sensor, and further is located on a conjugate image plane of the sensor. The DSM subsystem includes a trigger imager sensing component having a plurality of pixels for receiving the redirected portion of the incoming optical signal and sensing which ones of said pixels correspond to the redirected portion of the incoming optical signal. The DSM subsystem also includes an arrayed image switch (AIS) having a plurality of independently controllable elements for modulating portions of the incoming optical signal, and where the pixels of the trigger imager are mapped to ones of the elements. The DSM subsystem also includes a first feedback loop connecting an output of the trigger imager to an input of the AIS to enable the trigger imager to inform the AIS which one or more of the independently controllable elements needs to be activated to respond to the redirected of the incoming optical signal.

In still another aspect the present disclosure relates to a method of monitoring an incoming optical signal being imaged by a sensor. The method may comprise using a passive sensing and modulation component to sense when a first characteristic associated with the incoming optical signal is present that adversely affects operation of the sensor. When the first characteristic associated with the incoming optical signal is present, the method involves using the passive sensing and modulation component to redirect at least a portion of the incoming optical signal thereof away from the sensor to thus reduce an intensity of the incoming optical signal reaching the sensor. The sensor is located on an image plane downstream of the passive modulation and sensing component, relative to a path of travel of the incoming optical signal. The method further includes using an active sensing and modulation subsystem, located upstream of the passive sensing and modulation component relative to the direction of travel of the incoming optical signal, and on a conjugate image plane of the sensor, to receive and use the redirected portion of the incoming optical signal as a first feedback signal to help modify the incoming optical signal as needed to reduce a risk of damage to the passive sensing and modulation component as a result of the presence of the first characteristic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides solutions to the above-described limitations of present day ISM and DSM approaches, and advantageously draws on the strengths of both ISM and DSM approaches to meet the emerging need for an ultra-fast protective response while retaining resiliency under extremes in optical signal duration and intensity.

In various embodiments the present disclosure incorporates a DSM modulator, which in one embodiment is an active steering element, followed by an ISM system. The ISM system in one embodiment is a material. In one embodiment the active steering element and the ISM are wrapped together in a damage suppression feedback loop to provide both ultra-fast and long duration protection to the sensor. In another embodiment an additional outer disruption suppression feedback loop from the optical sensor back to the DSM modulator is incorporated which can attenuate the incoming light to avoid saturation on the optical sensor.

Figures 1, 1A:
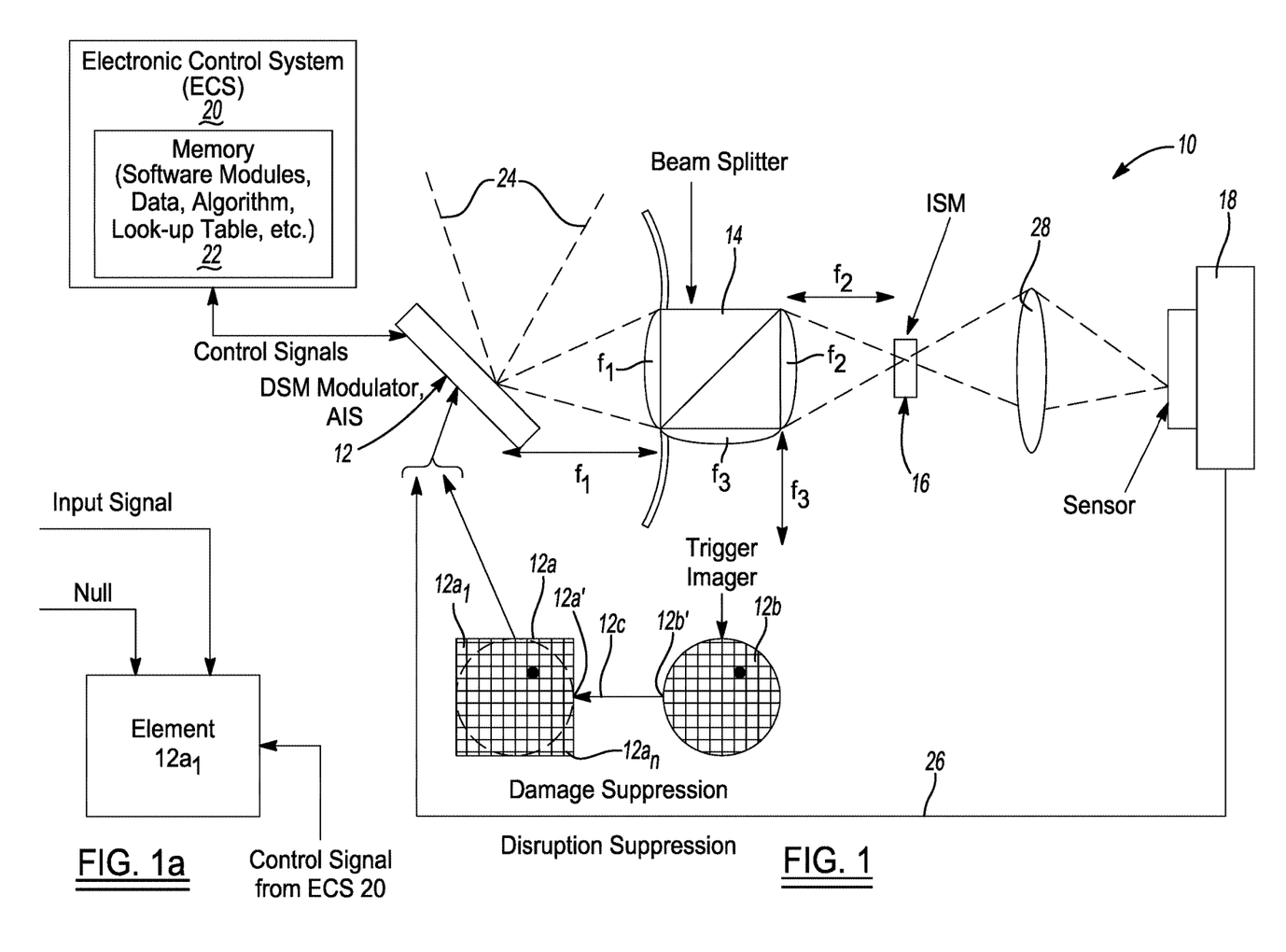
FIG. 1 is a block diagram of one embodiment of a system in accordance with the present disclosure, where the system is operating without experiencing any short duration or longer higher duration optical signals that might potentially damage either the sensor or the ISM.
FIG. 1a is a high level block diagram illustrating the inputs to one of the modulating elements of the AIS.

Referring to FIG. 1, a system 10 in accordance with one embodiment of the present disclosure is shown. The system 10 in this embodiment includes an active sensing and modulation subsystem, in this example a Decoupled Signal Modulator subsystem (hereinafter simply "DSM" 12). A passive sensing and modulation component is also included, which in this embodiment is an Integrated Sensing and Modulation component (hereinafter simply "ISM") 16. The DSM 12 and the ISM 16 are separated by a beam splitter 14. The DSM 16 includes an arrayed image switch (AIS) 12a which acts as a spatial filter and forms a modulator component of the DSM 12 to provide the needed optical signal modulation for the DSM. A trigger imager 12b forms a separate (i.e., independent) sensing component for the DSM 12 which uses a portion of the incoming optical signal which has been redirected by the ISM 16 to determine (i.e., sense) which elements (i.e., pixel(s)) of the AIS 12a need to be modulated to modify the incoming optical signal to reduce a possibility of damage to the ISM 16 or the sensor 18. The ISM 16 is preferably formed by a non-linear optical response material. The ISM 16 may be reflective or transmissive in its construction and operation. The redirected signal it produces will be an optical signal returned back up the optical column in either case. Thus, while FIG. 1 illustrates the system 10 with the ISM 16 being used with a reflective construction, both reflective and transmissive constructions are contemplated, with the transmissive construction requiring only minor modifications to the system that will be understood by those skilled in the art.

The ISM 16 is located upstream of a sensor 18 relative to a path of propagation of an incoming optical signal being imaged by the system 10. In the system 10 the sensor 18 forms an optical sensor. In this embodiment the sensor 18 is placed at an image plane, and the AIS 12a and the ISM 16 are placed on separate conjugate image planes, with the AIS 12a ahead of, that is first exposed to the incoming optical signal, of the ISM subsystem 16, which is ahead (i.e., upstream relative to the direction of propagation of the incoming optical signal) of the sensor 18. However, it will be appreciated that the system 10 is not limited to this specific configuration, and other potential arrangements of the components are contemplated as well. For instance, the ISM need not be on an image plane.

The system 10 in the embodiment shown also includes an electronic control system 20 having a memory 22 (e.g., non-volatile RAM, ROM, etc.) for storing one or more software control modules, data, algorithms, look-up tables, etc.) that may be used by the electronic control system 20 in monitoring and carrying out operation of the system 10. The electronic control system 20 also communicates with the DSM 12 to help control operation of the system 10.

The AIS 12a is comprised of a plurality of individually addressable/controllable elements $12a_1$-$12a_n$, which may be thought of as pixels, as indicated in the inset portion of FIG. 1, which may be independently controlled by suitable control signals from the electronic control system 20. As shown in the simplified block diagram of FIG. 1a, each element $12a_1$-$12a_n$ is associated with a first independent input image channel which receives a portion of the incoming optical signal, as well as a second input channel which is associated with a null signal. The dotted lines 24 in FIG. 1 show the light being received by a single element $12a_1$-$12a_n$ of the AIS 12a, corresponding to a sub-aperture of the full image incident on the AIS 12a. A small portion of the incoming optical signal being received by the system 10 is thus represented by the lines 24 in FIG. 1.

In operation of the system 10, modulation of each element $12a_1$-$12a_n$ in the AIS 12a by the electronic control system 20 causes each element to switch between the incoming image of interest (represented by the lines 24) on the element as one input image channel and the null signal on the second input image channel. One preferred implementation of the present AIS 12a is with a Lightfield Directing Array, which is the subject of U.S. Pat. No. 10,444,492 to Hopkins et al., issued Oct. 15, 2019 and assigned to the assignee of the present disclosure, the full disclosure of which is hereby incorporated by reference into the present disclosure. While an even greater number of input channels can be used with each element $12a_1$-$12a_n$ of the AIS 12a, two input channels represents the preferred number of channels for the system 10 as the goal is to modulate each element $12a_1$-$12a_n$ between the image of interest and the null signal, thus providing a capability to provide element-by-element control of the intensity of the image of interest.

The AIS 12a of the DSM 12 attenuates the incoming image on an element-by-element basis by switching between the active input image channel and the null channel for each element $12a_1$-$12a_n$. This provides protection from extreme intensity and duration signals that the element may be exposed to. The material-based ISM 16 provides the fast passive response approach, as well as a feedback signal via a disruption suppression feedback signal line 26, which drives the AIS 12a-based active approach. The image is passed from the AIS 12a to the ISM 16. The ISM 16 passes the image to a focusing lens 28, which passes a conjugate of the image to the image sensor 18, whether through reflectance or transmittance, nominally without any attenuation. The trigger imager 12b forms the feedback sensor which is focused on the ISM 16 surface and measures for the non-linear transition of the ISM subsystem, which indicates the image light intensity has reached threshold levels. The trigger imager 12b receives a reflected signal generated by the ISM 16 via a beam splitter 14. The reflected signal in this example would be a short duration, high intensity signal which the ISM 16 has reflected back to protect the sensor 18. It should be noted that the ISM 16 is located at a conjugate image plane in FIG. 1, however, it does not need to be located at a conjugate image plane for the sensor protection design to function. The ISM 16 can be a coating on a lens, on the exit aperture of the beamsplitter 14, or even on the sensor 18 itself. It is only important that the ISM 16 be located after the beamsplitter 14 and before the sensor 18.

The trigger imager 12b registers the section(s) of the image where the ISM 16 has undergone transition (due to extreme intensity) and passes back a signal to the AIS 12a to attenuate the light passing to this area (or to these areas). In effect the trigger imager 12b maps those areas (i.e., pixel locations) which have received redirected light to the AIS 12a. The image is discretized into subsections corresponding to the elements $12a_1$-$12a_n$ in the AIS 12a. A damage suppression feedback loop 12c formed between the trigger imager 12b and the AIS elements $12a_1$-$12a_n$ enables a command to be passed from an output 12b' of the trigger imager 12b to an input 12a' of the AIS 12a, and then to each of these elements $12a_1$-$12a_n$ that is responsive to any cases of extreme intensity in the corresponding area, and the appropriate AIS element is then reoriented (e.g., tilted) to redirect and thus attenuate the light passing to the ISM 16 via the DSM 12. The damage suppression feedback process enabled by the damage suppression feedback loop 12c reduces the intensity of the light on the corresponding element's sub-aperture until the intensity falls below the transition threshold for the ISM 16. This reduction allows the sensor 18 to continue operating in the AIS 12a attenuated sub-aperture. The sensor 18 can also still generate an accurate image of the attenuated sub-aperture region through a process of applying scaling factors of the inverse of the known AIS 12a and ISM 16 attenuation factors. The feedback process may be tuned to drive the signal at the trigger imager 12b down to zero by attenuating the incoming light so it falls below the ISM 16 threshold. A simple example of such a controller would be a binary response where any signal from the trigger imager 12b would trigger an immediate response for the corresponding AIS element $12a_1$-$12a_n$ to drive the attenuation down towards zero. Once the trigger imager 12b stops receiving a threshold signal, the damage suppression feedback loop 12c formed between the trigger imager 12b and the AIS 12a command may return to zero. This ensures that the system 10 always drives down the intensity to values below the critical ISM 16 threshold. In the regime below the critical ISM 16 intensity threshold, the system 10 safely operates via the disruption suppression proportional loop 26 which uses signals received by the sensor 18 as a source of feedback to drive attenuation commands to the AIS 12a to keep the signal below the saturation threshold of the sensor 18.

The biggest challenge and reason for the disruption suppression feedback loop 26 is the potential case where a rapid pulse of light is able to trigger the ISM 16 response before the sensor 18 can observe any change. Now the system 10 would read the sensor 18 as below a saturation threshold but the ISM 16 would be accruing damage and would require immediate attenuation from the AIS 12a.

The disruption suppression feedback loop 26 thus operates to help ensure that the optical signal reaching the sensor 18 signal always falls below the predetermined saturation threshold of the sensor. A specific implementation of the disruption suppression feedback loop 26 is to have the ECS 20 programmed with a reference target value for intensity which would be slightly under the sensor 18 threshold. If the sensed intensity is below this programmed reference target value, the AIS 12a may drive its own attenuation down to zero to further boost the signal. As the intensity of the incoming optical signal surpasses the reference value, the integral feedback would build up an increasing compensation command to the AIS 12a driving down the attenuation to bring the intensity back to the reference value. The scale of attenuation generated by the AIS 12a is known for each element $12a_1$-$12a_n$, so the image intensity at the sensor 18 (at the location of each element) could be scaled by the inverse of the element's attenuation to reconstruct an unattenuated image.

Operation Above Saturation Threshold

Figure 2:
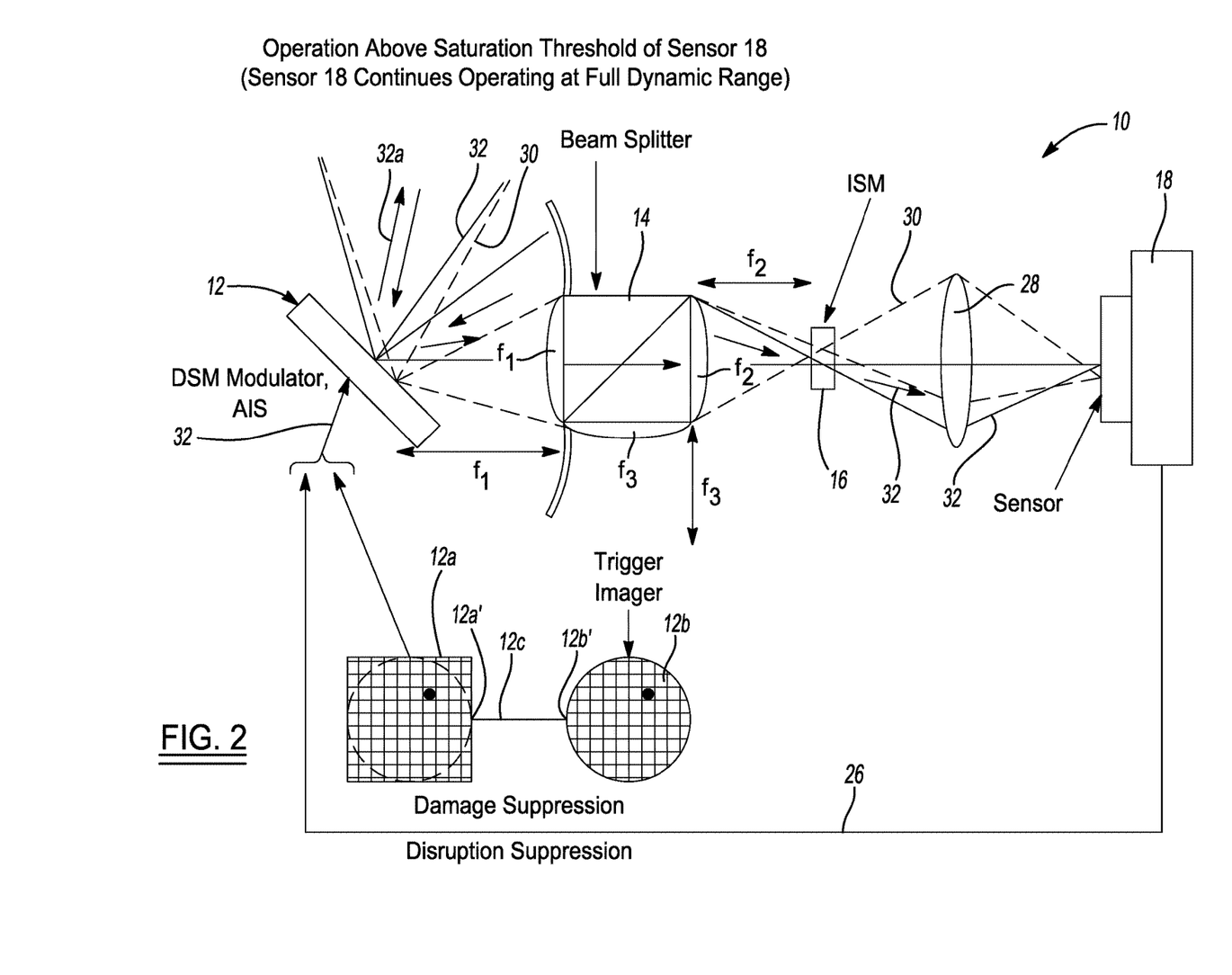
FIG. 2 shows the system of FIG. 1, but where the system is now experiencing a high amplitude optical signal at a subaperture that produces saturation on one or more pixels of the sensor, and further showing how a disruption suppression feedback line associated with the AIS of the DSM is controlled to modulate and reduce the intensity of the incoming optical signal at the subaperture, essentially in real time, to bring the intensity seen by the subaperture down to just below a saturation level, to enable continued operation of the sensor with the risk of damage to the sensor or the ISM.

The disruption suppression feedback loop 26 is shown in operation in FIG. 2 in the case of intensity which is above the sensor 18 saturation threshold but below the ISM 16 threshold. To avoid cluttering the figure the ECS 20 and its associated components are not shown in FIG. 2 but it will be understood that these components are present and helping to control system 10 operation. The dotted lines 30 show an unaffected sub-aperture, while the heavy solid lines 32 show a sub-aperture which is receiving an intensity above the saturation threshold on the sensor 18. The AIS 12a responds by adjusting the reflecting path within the DSM 12 until the intensity of the reflected signal is attenuated sufficiently to bring it back down under the saturation threshold of the sensor 18. The attenuated light is reflected off an aperture stop around a lens f1, as indicated by solid arrow 32a. In one preferred embodiment the aperture stop around lens f1 is a retroreflective material, so the light is returned along the same path it entered and leaves the system 10 entirely.

Operation Above ISM Threshold

Figure 3:
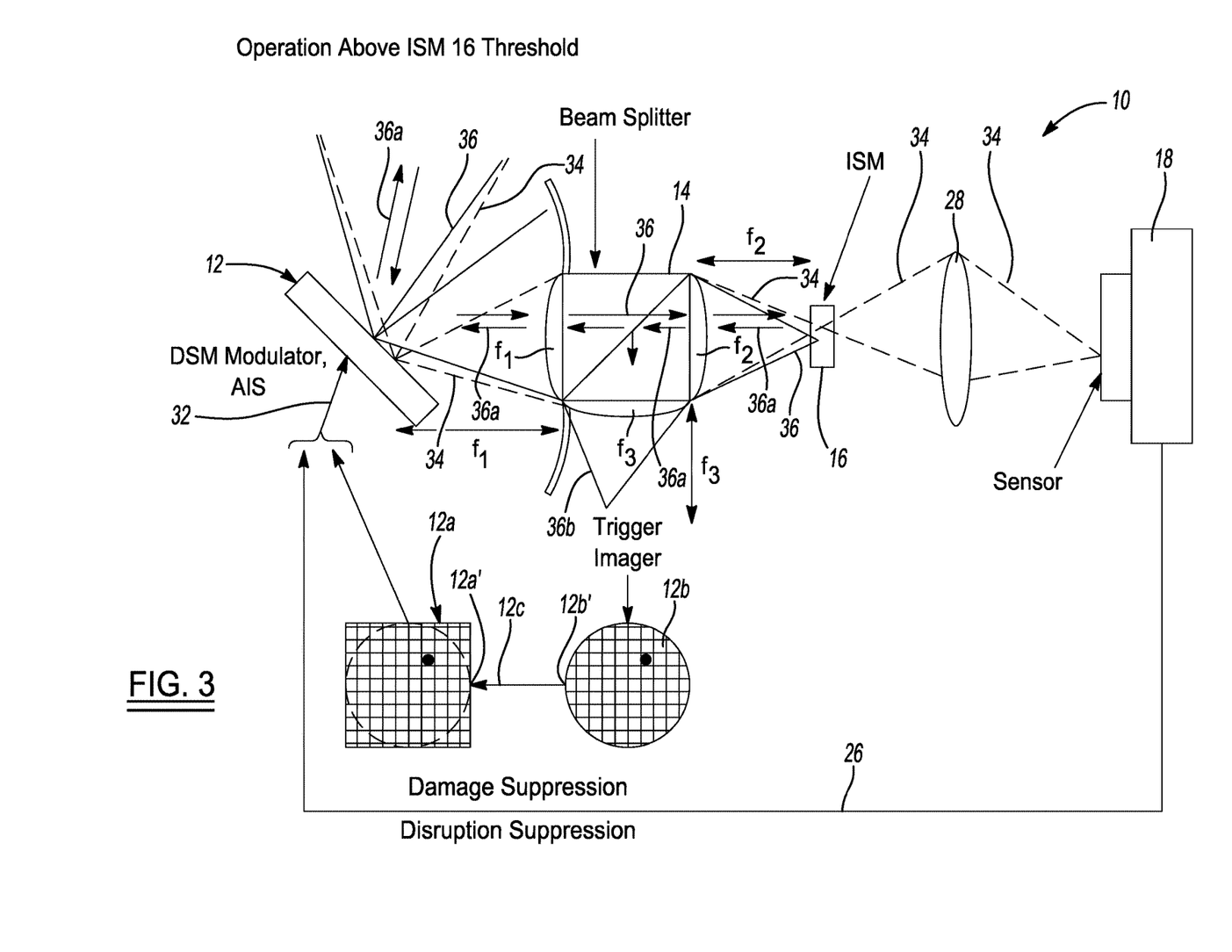
FIG. 3 shows the system of FIG. 1, but where the system has experienced a short duration, high intensity reflected optical signal from the ISM in a subaperture of the sensor, and further showing how the reflected optical signal is directed through a beam splitter and mapped by the trigger imager via the damage suppression feedback loop back to the AIS, and the AIS used to modulate the intensity of incoming light in the subaperture as needed, essentially in real time, to protect the ISM and the sensor.

The damage suppression feedback loop 12c is shown in operation in FIG. 3 below in the case of a received signal intensity which is above the ISM 16 threshold. Again, the ECS 20 and its associated components have been omitted from this figure, but it will be understood that they are present and helping to control system 10 operation. The dotted lines 34 show an unaffected sub-aperture, while the solid heavy lines 36 show a sub-aperture of the DSM 12 which is receiving an intensity above the ISM 16 threshold. In this scenario, the high intensity light passes into the aperture, reaches the ISM 16 and causes it to respond to the high intensity light. In this preferred embodiment the ISM 16 is an intensity dependent phase conjugate mirror material (e.g., lithium niobate crystal LiNbO3, lithium formate, etc.) which is normally transmissive but switches to reflective behavior under high intensity light above a predetermined intensity threshold.

The high intensity sub-aperture section which the ISM 16 is exposed to triggers this change in the ISM 16, and the ISM returns the light directly up the optical column in reverse, as indicated by arrows 36a. The beam splitter 14 placed between the AIS 12a and ISM 16 captures a very small portion of this returning light, indicated by arrow 36b, and diverts it to the trigger imager 12b. The beam splitter 14 is placed within the image transferring lens in this configuration so that it can be in a section of beam collimation to avoid distorting the incoming optical image. In contrast, a beam splitter placed in an image transfer relay will often distort the incoming optical image. The solution is generally to locate the beam splitter 14 in a collimated section focused at infinity. The AIS 12a is then located at a focal length away from the f1 lens, so the image is passed to a collimated beam within the beam splitter 14, then the process is reversed by lens f2 to generate the image at the ISM 16. A lens f3 can be adjusted to focus the image seen by the ISM 16 onto the trigger imager 12b. In one preferred embodiment the trigger imager 12b may be formed by a small array of photodetectors, for example similar to a CCD image sensor. An array with a minimal number of pixels, perhaps only little more than the number of elements $12a_1$-$12a_n$ in the AIS 12a, is preferred because it allows for faster refresh times, and thus a more quickly responsive damage suppression feedback loop 12c. The minimum array size on the trigger imager 12b is one which uses a single pixel for each element $12a_1$-$12a_n$ in the AIS 12a. FIG. 3 represents the initial response of the system 10 to a rapid change in light within a sub-aperture of the incoming optical signal.

The material-based ISM 16 in this embodiment is able to provide a rapid response that blocks the incoming high intensity light pulse from reaching the sensor 18, but it effectively starts a countdown until the ISM 16 is damaged by the high intensity light. ISM 16 damage can be averted by the disruption suppression feedback loop 26 triggering an immediate response of the appropriate AIS 12a sub-aperture element(s) $12a_1$-$12a_n$ to attenuate the incoming optical signal reaching the ISM until it falls below the predetermined ISM intensity threshold.

Figure 4:
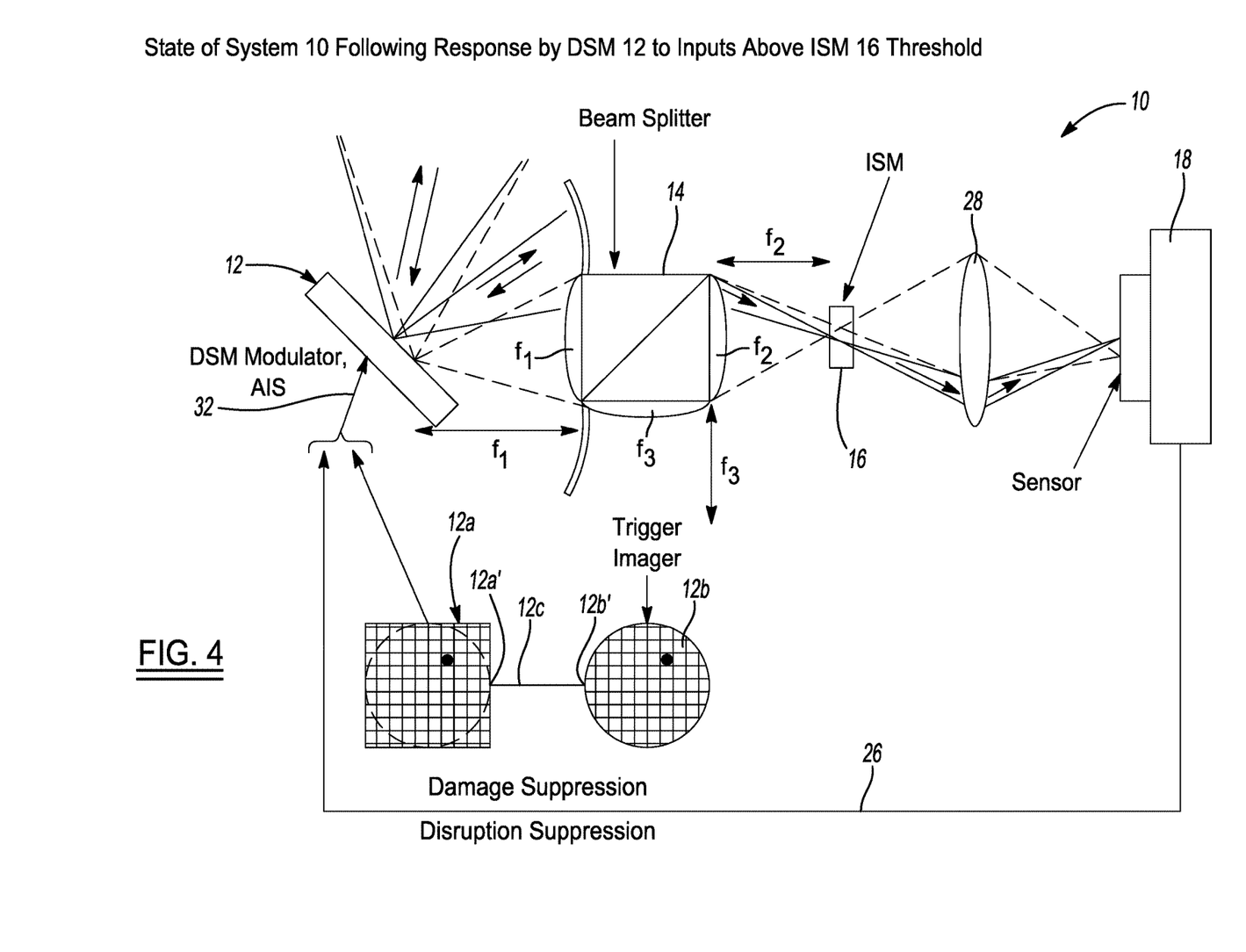
FIG. 4 shows the system of FIG. 3 following the DSM response to the trigger imager inputs, and how the sensor is able to continue receiving an optical signal from the affected subaperture which is below the damage threshold level of the ISM and below the saturation level of the sensor.

The AIS 12a attenuation response represents the slower but more durable DSM 12 response to the incident light and is shown in FIG. 4. The AIS 12a acts as the DSM 12 modulator component and drives down the intensity at the critical sub-aperture region until the intensity falls below the predetermined maximum threshold for the ISM 16. The disruption suppression feedback loop 26 reverts back to null output at that point, as it has driven the system 10 back below ISM 16 maximum threshold intensities. The disruption suppression feedback loop 26 remains active and takes over dominant control at this point. It seeks to bring the scale of the intensity at the sensor 18 back down to the sensor saturation threshold or below. The handoff between these two loops 12c and 26 does not cause any instability. The damage suppression feedback loop 12c helps to cause the system 10 to suppress the intensity of a portion (or portions) of the incoming optical signal down to a level below the ISM 16 maximum threshold, so it can never accidentally reach the point of ISM damage, while the sensor 18 falsely believes it is seeing a sub-saturation signal. The disruption suppression feedback loop 26 is always operational (i.e., always operating simultaneously with the damage suppression feedback look 12c) and always responds to high intensity signals by attenuating them so the sensor 18 can retain full operation. The damage thresholds are generally going to be many orders of magnitude above the saturation thresholds. This means that the endpoint of the damage suppression feedback loop 12c will likely be the sub-aperture being left in a significantly saturated state. The disruption suppression feedback loop 26 is able to stably run in this condition and attenuates the optical input until the sensor 18 is functional again. FIG. 4 represents the system 10 in the final equilibrium state of having responded to ISM 16 saturation by applying significant attenuation, then having fine-tuned the attenuation until the sensor 18 is again operational.

Figure 5:
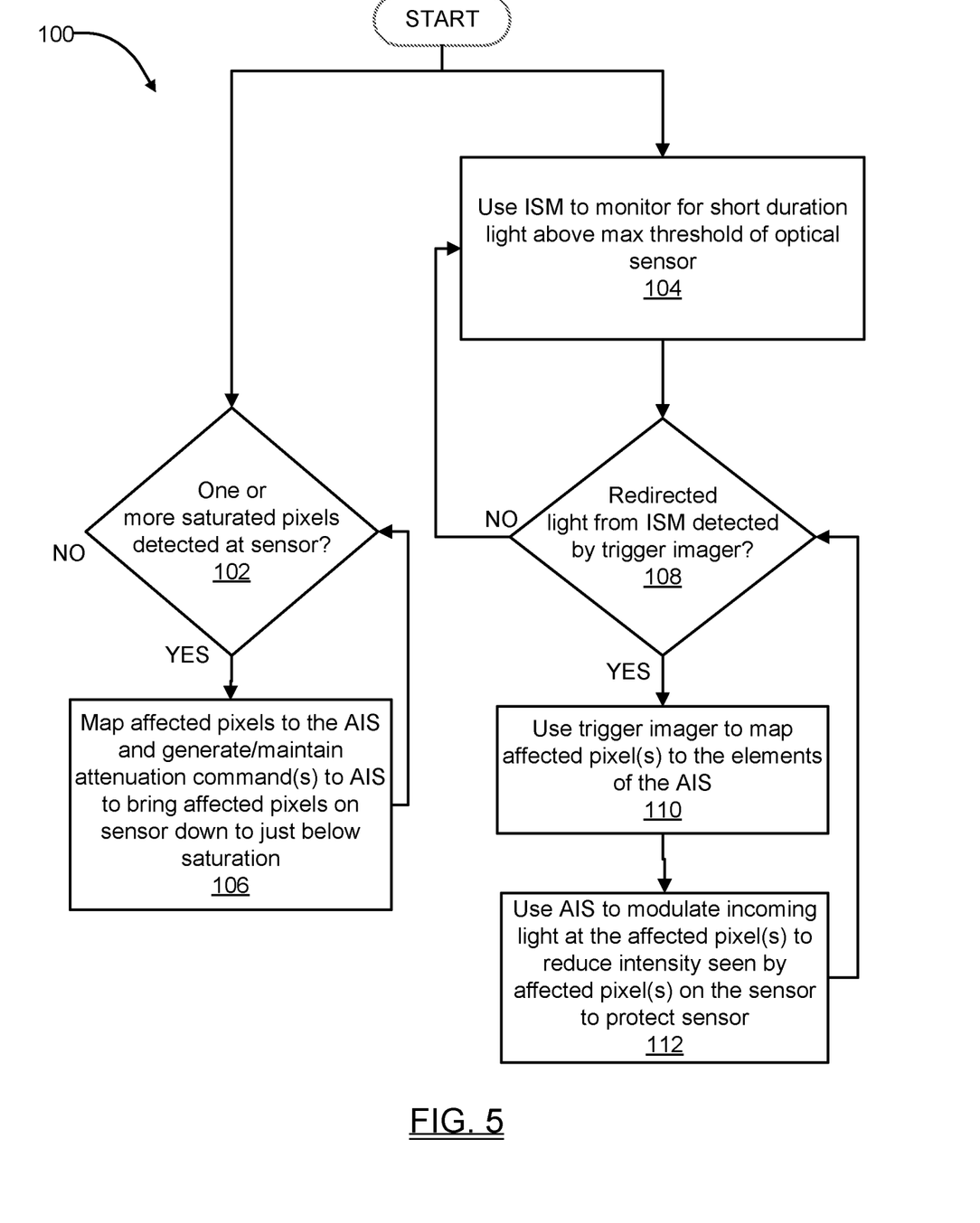
FIG. 5 is a high level flowchart illustrating one example of sequences of operations of the system of FIG. 1 in monitoring and protecting both the sensor and the ISM when optical signals are received which might saturate the sensor or damage the ISM.

FIG. 5 shows a flowchart 100 illustrating various operations that may be performed by the system 10. At operation 102 the DSM 12 trigger imager 12b is used to monitor the feedback signal on the disruption suppression feedback loop 26. Substantially simultaneously, the ISM 16 is used to monitor for short duration light pulses above the maximum threshold of the optical sensor 18. The check at operation 102 involves using the ECS 20 to determine if one or more saturated pixels have been detected at the sensor 18. Substantially simultaneously, the trigger imager 12b is checking for any redirected light from the ISM 16, as indicated at operation 108. If the check at operation 102 reveals one or more saturated pixels at the sensor 18, then the trigger imager 12b maps the affected pixels to the AIS 12a and the AIS modulates (or maintains control over) the affected elements $12a_1$-$12a_n$ to attenuate the signal received on the affected pixels of the sensor 18 to the point where the intensity of the signal is brought down to just below the saturation threshold of the sensor 18, as indicated at operation 106. This allows the sensor 18 to keep receiving optical signals associated with the affected elements $12a_1$-$12a_n$ (i.e., the pixels associated with the sub-aperture of interest), but now the intensity is reduced to a level where no damage of the sensor 18 can occur. If the check at operation 108 reveals that redirected light has been detected by the trigger imager 12b, then at operation 110 the trigger imager maps the affected pixel(s) to the AIS 12a (i.e., to the corresponding elements $12a_1$-$12a_n$). At operation 112, the AIS 12a controls its elements $12a_1$-$12n$ as needed to modulate the light incident on the ISM 16 to reduce the intensity seen by the affected subaperture of the ISM, to thus protect the ISM as well as the sensor 18.

Time Scales

There are several time-scale design considerations for the sensor protection approach described above. The dual approach used in this system 10 and method combines both ultra-fast and extreme intensity/duration protection, but the response scale of both the ISM 16 and DSM 12 need to be carefully engineered. The ISM 16 can be selected for performance metrics like optimal speed response without significant concern about durability under extreme intensity/duration signals. This significantly relaxes the requirements on the DSM 12, providing more options for the designers. The feedback response time of the modulator for the DSM 12 should be set to be below the threshold survival duration for the ISM 16, so that the DSM feedback response is sufficiently quick to attenuate the high intensity light before it damages the ISM. When this is all engineered correctly, then the sensor protection approach described herein is able to respond successfully to both ultra-fast and long duration threats by smoothly transitioning the protection burden back and forth between the ISM 16 and the DSM 12.

While a preferred embodiment for the system 10 is focused on the visible light domain, the approach is not fundamentally limited to only visible light operation. The tradeoff is that the AIS 12 elements $12a_1$-$12a_n$ must be significantly larger than the wavelength of interest, so a system for mm to cm wavelengths may end up being too large and slow for viable operation.

Real World Applications

One use for optical sensor protection is for safety critical systems which could accidentally or deliberately be damaged/disabled by bright lights. This situation might be found on planes, satellites or future autonomous vehicles, where cameras are employed to provide situational awareness. Blinding or damage to the sensors, as might be caused by high intensity headlights on a dark-vision camera, could cause significant risk, justifying the increased system complexity. Another use for sensor protection is for eye safety in potentially dangerous environments. Devices such as binoculars, telescopes or other eye pieces could use the optical sensor protection approach to both automatically scale image intensity to help users retain full vision sensitivity in high dynamic range environments and to protect users eyes from possible damage. These are but a few potential implementations of the various embodiments and methods of the present disclosure, and these examples are not meant to represent an exhaustive list of all possible implementations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An optical sensor protection system, comprising:
a sensor for receiving an incoming optical signal;
a passive sensing and modulation component configured to sense when a first characteristic is associated with the incoming optical signal is present that adversely affects operation of the sensor, and redirects at least a portion of the incoming optical signal thereof away from the sensor to thus reduce an intensity of the incoming optical signal reaching the sensor, the sensor being located on an image plane downstream of the passive sensing and modulation component, relative to a path of travel of the incoming optical signal; and
an active sensing and modulation subsystem located upstream of the passive sensing and modulation component relative to the path of travel of the incoming optical signal and further being located on a conjugate image plane with the sensor, and configured to use the redirected portion of the incoming optical signal as feedback in controlling modulation of the incoming optical signal by an active modulation component located at a conjugate image plane with the sensor, upstream from the sensor and the passive sensing and modulation component, to reduce a risk of damage to the passive sensing and modulation component.

2. The system of claim 1, wherein the passive sensing and modulation component comprises an independent spatial modulator (ISM) component.

3. The system of claim 2, wherein the active sensing and modulation subsystem comprises a decoupled spatial modulation (DSM) subsystem having:
a trigger imager sensing component having a plurality of pixels for receiving the redirected portion of the incoming optical signal and sensing which ones of said pixels correspond to the redirected portion of the incoming optical signal;
an arrayed image switch (AIS) forming the active modulation component, the AIS having a plurality of independently controllable elements for modulating portions of the incoming optical signal, and where the pixels of the trigger imager are mapped to ones of the elements; and
a first feedback loop connecting an output of the trigger imager to an input of the AIS to enable the trigger imager to inform the AIS which one or more of the independently controllable elements needs to be activated to respond to the redirected portion of the incoming optical signal.

4. The system of claim 3, further comprising a second feedback loop for providing an output from the sensor to the DSM subsystem.

5. The system of claim 4, further comprising a beamsplitter disposed between the DSM subsystem and the ISM, the beamsplitter configured to receive the redirected optical signal and direct the redirected optical signal to the DSM subsystem.

6. The system of claim 5, wherein the DSM subsystem is upstream of the beamsplitter, relative to a direction of propagation of the incoming optical signal.

7. The system of claim 6, wherein the beamsplitter is upstream of the ISM, relative to the direction of propagation of the incoming optical signal.

8. The system of claim 1, further comprising an electronic control system for controlling the active sensing subsystem.

9. An optical sensor protection system, comprising:
a sensor for receiving an incoming optical signal;
a passive sensing and modulation component forming an integrated sensing and modulation (ISM) component configured to sense when a first characteristic is associated with the incoming optical signal is present that adversely affects operation of the sensor, and redirects at least a portion of the incoming optical signal thereof away from the sensor to thus reduce an intensity of the incoming optical signal reaching the sensor, the sensor being located on an image plane downstream of the ISM component, relative to a path of travel of the incoming optical signal; and an active sensing and modulation subsystem forming a decoupled spatial modulator (DSM) subsystem located upstream of the ISM component relative to the path of travel of the incoming optical signal and upstream of the sensor, and further being located on a conjugate image plane of the sensor;

the DSM subsystem including:
- a trigger imager sensing component having a plurality of pixels for receiving the redirected portion of the incoming optical signal and sensing which ones of said pixels correspond to the redirected portion of the incoming optical signal;
- an arrayed image switch (AIS) having a plurality of independently controllable elements for modulating portions of the incoming optical signal, and where the pixels of the trigger imager are mapped to ones of the elements; and
- a first feedback loop connecting an output of the trigger imager to an input of the AIS to enable the trigger imager to inform the AIS which one or more of the independently controllable elements needs to be activated to respond to the redirected portion of the incoming optical signal.

10. The system of claim 9, further comprising a second feedback loop for providing an output from the sensor to the DSM subsystem.

11. The system of claim 10, further comprising a beamsplitter configured to receive the redirected optical signal from the ISM component and direct the redirected optical signal to the trigger imager of the DSM subsystem.

12. The system of claim 11, wherein the beamsplitter is disposed downstream of the DSM subsystem, relative to a direction of travel of the incoming optical signal.

13. The system of claim 12, wherein the beamsplitter is disposed upstream of the ISM component, relative to the path of travel of the incoming optical signal.

14. The system of claim 9, further comprising an electronic control system for controlling operation of the DSM subsystem.

15. A method of monitoring an incoming optical signal being imaged by a sensor, the method comprising:
- using a passive sensing and modulation component to sense when a first characteristic associated with the incoming optical signal is present that adversely affects operation of the sensor;
- when the first characteristic associated with the incoming optical signal is present, using the passive sensing and modulation component to redirect at least a portion of the incoming optical signal thereof away from the sensor to thus reduce an intensity of the incoming optical signal reaching the sensor, the sensor being located on an image plane downstream of the passive modulation and sensing component, relative to a path of travel of the incoming optical signal; and
- using an active sensing and modulation subsystem, located upstream of the passive sensing and modulation component relative to a direction of travel of the incoming optical signal, and on a conjugate image plane of the sensor, to receive and use the redirected portion of the incoming optical signal as a first feedback signal to help modify the incoming optical signal as needed to reduce a risk of damage to the passive sensing and modulation component as a result of a presence of the first characteristic.

16. The method of claim 15, further comprising arranging the active sensing and modulation subsystem in series with the passive sensing and modulation component.

17. The method of claim 16, further comprising using the active sensing and modulation subsystem to receive a second feedback signal from the sensor.

18. The method of claim 17, further comprising using the active sensing and modulation subsystem to modify the incoming optical signal when it is detected that a second signal characteristic is present in the second feedback signal supplied from the sensor.

19. The method of claim 16, further comprising using a beamsplitter to receive the redirected portion of the incoming optical signal and direct the redirected portion of the incoming optical signal to the active sensing and modulation subsystem.

20. The method of claim 19, further comprising configuring the beamsplitter downstream from the active sensing and modulation subsystem and upstream of the passive sensing and modulation component.

* * * * *